US011966959B2

(12) United States Patent
DeLuca et al.

(10) Patent No.: US 11,966,959 B2
(45) Date of Patent: Apr. 23, 2024

(54) SUBSCRIPTION OF MARKETPLACE CONTENT BASED ON SEARCH QUERIES

(71) Applicant: International Business Machines Corporation, Armonk, NY (US)

(72) Inventors: Lisa Seacat DeLuca, Baltimore, MD (US); Chandler Maskal, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/029,160

(22) Filed: Sep. 23, 2020

(65) Prior Publication Data

US 2022/0092665 A1    Mar. 24, 2022

(51) Int. Cl.
G06Q 30/0601    (2023.01)
G06F 16/9535    (2019.01)
H04L 67/306    (2022.01)

(52) U.S. Cl.
CPC ..... G06Q 30/0625 (2013.01); G06F 16/9535 (2019.01); H04L 67/306 (2013.01)

(58) Field of Classification Search
None
See application file for complete search history.

(56) References Cited

U.S. PATENT DOCUMENTS

| | | | |
|---|---|---|---|
| 5,592,664 A | 1/1997 | Starkey | |
| 7,543,003 B2 | 6/2009 | Shukla et al. | |
| 7,912,852 B1 * | 3/2011 | McElroy | G06F 16/951 707/769 |
| 7,933,818 B1 * | 4/2011 | Kumar | G06Q 40/00 705/26.1 |
| 8,037,040 B2 | 10/2011 | Vemuri et al. | |
| 9,665,588 B2 | 5/2017 | MacLauren | |
| 10,289,712 B2 | 5/2019 | Jeh et al. | |
| 2004/0205048 A1 | 10/2004 | Pizzo et al. | |
| 2007/0282795 A1 * | 12/2007 | Mashinsky | G06F 16/958 |
| 2013/0060660 A1 * | 3/2013 | Maskatia | G06Q 30/00 705/26.35 |
| 2016/0314510 A1 | 10/2016 | Brown | |
| 2018/0336506 A1 * | 11/2018 | Malhotra | G06Q 20/3224 |
| 2019/0258747 A1 * | 8/2019 | Milev | G06F 16/9032 |
| 2020/0401576 A1 * | 12/2020 | Yerli | G06T 15/205 |

(Continued)

OTHER PUBLICATIONS

A. Rasheed, O. San and T. Kvamsdal, "Digital Twin: Values, Challenges and Enablers From a Modeling Perspective," in IEEE Access, vol. 8, pp. 21980-22012, 2020, doi: 10.1109/ACCESS.2020.2970143. (Year: 2020).*

(Continued)

*Primary Examiner* — Michelle T Kringen
(74) *Attorney, Agent, or Firm* — Michael O'Keefe

(57) ABSTRACT

In an approach to providing a notification of content to a marketplace subscriber, one or more computer processors monitor a query for content in an online marketplace. One or more computer processors determine that the content was not found. One or more computer processors receive new content to the online marketplace. One or more computer processors determine that the new content corresponds to the query for which the content was not found. One or more computer processors send a notification of the new content.

20 Claims, 4 Drawing Sheets

(56) References Cited

U.S. PATENT DOCUMENTS

2021/0103972 A1* 4/2021 Baal .................. G06Q 10/20

OTHER PUBLICATIONS

IP.com Disclosure No. IPCOM000261196D, "Method and System for managing an ecosystem of IoT data tailored to customer needs" in The IP.com Prior Art Database; URL: https://ip.com/IPCOM/000261196 (Year: 2020).*

"IBM Digital Twin Exchange", Overview IBM, Printed Jun. 28, 2020, 5 pages, <https://www.ibm.com/products/digital-twin-exchange>.

* cited by examiner

US 11,966,959 B2

SUBSCRIPTION OF MARKETPLACE CONTENT BASED ON SEARCH QUERIES

BACKGROUND OF THE INVENTION

The present invention relates generally to the field of search engines, and more particularly to providing a notification of content to a marketplace subscriber.

Online marketplaces are information technology platforms that act as intermediaries by connecting sellers and consumers. On the web site of the online marketplace, sellers can publish their product offering with a price and information on the product's features and qualities. Potential customers can search and browse goods, compare price and quality, and then purchase the goods directly from the seller. The inventory is held by the sellers, not the company running the online marketplace. Online marketplaces are characterized by a low setup cost for sellers because they do not have to run a retail store, although the sellers may have to pay to subscribe to the online marketplace service. For consumers, online marketplaces reduce the search cost and provide a wide variety of products to choose from.

An example of an online marketplace is a digital twin marketplace. A digital twin refers to a digital representation of a physical asset. In Internet of Things (IoT) systems, a digital twin can represent an evolving virtual data model that mimics the physical asset as well as the experiences and state changes of the physical asset. A digital twin may be said to store and track information about its twin physical asset. A digital twin marketplace allows manufacturers and suppliers to share digital resources associated with physical assets with owners and operators of the manufacturers' physical assets. Examples of digital resources include, but are not limited to, a bill of materials, warranty bulletins, warranty claims, maintenance plans, maintenance history, part replacement history, part usage history, specifications, 3-dimensional model and drawing data, operating manuals, usage data, operating history, ownership history, applicable standards, etc.

SUMMARY

Embodiments of the present invention disclose a computer-implemented method, a computer program product, and a system for providing a notification of content to a marketplace subscriber. The computer-implemented method may include one or more computer processors monitoring a query for content in an online marketplace. One or more computer processors determine that the content was not found. One or more computer processors receive new content to the online marketplace. One or more computer processors determine that the new content corresponds to the query for which the content was not found. One or more computer processors send a notification of the new content.

DETAILED DESCRIPTION

A problem faced by online marketplaces, especially at start-up, is the development of content. The content needs to be the right content to satisfy the business and operations needs of the owners and operators of the products sold in the online marketplace, where content can include both physical and digital resources. As an online marketplace is established, there can be a lag between when a user searches for content and when the content is available. Users may search for content in the marketplace, but no search results are displayed. Embodiments of the present invention recognize that efficiency may be gained by providing an alert to a user when content, previously searched for but not found, becomes available in the online marketplace. Implementation of embodiments of the invention may take a variety of forms, and exemplary implementation details are discussed subsequently with reference to the Figures.

Figure 1:
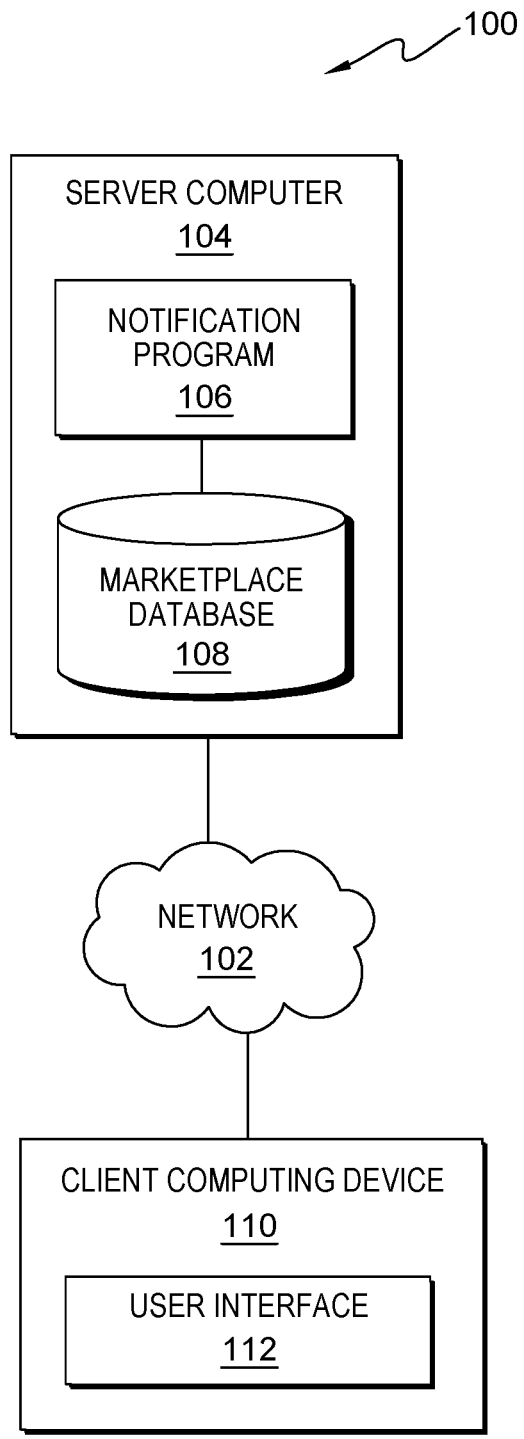
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes notification program 106 and marketplace database 108. Server computer 104 may include internal and external hardware components, as depicted and described in further detail with respect to FIG. 4.

Notification program 106 provides a notification to an online marketplace user when content the user had unsuccessfully searched for in the past becomes available in the online marketplace. Notification program 106 monitors search queries for marketplace content. Notification program 106 determines that no content is found. Notification program 106 maps the query to a content owner. Notification program 106 sends a subscription confirmation request to the user. Notification program 106 stores the query with user information. Notification program 106 determines whether previously searched content is received. If notification program 106 determines that previously searched content is received, then notification program 106 determines users that subscribed for the received content and sends a notification of the received content to the users. Notification program 106 is depicted and described in further detail with respect to FIG. 2.

Marketplace database 108 is a repository for data used by notification program 106. Marketplace database 108 can represent one or more databases. In the depicted embodiment marketplace database 108 resides on server computer 104. In another embodiment, marketplace database 108 may reside elsewhere within distributed data processing environment 100, provided notification program 106 has access to marketplace database 108. A database is an organized collection of data. Marketplace database 108 can be implemented with any type of storage device capable of storing data and configuration files that can be accessed and utilized by notification program 106, such as a database server, a hard disk drive, or a flash memory. Marketplace database 108 stores a corpus of content associated with physical and/or digital resources provided by one or more manufacturers, suppliers, and/or other types of content owners which plan to sell the content in the marketplace. For example, if the marketplace is a digital twin marketplace, then marketplace database 108 stores digital content associated with a physical asset, such as a bill of materials or an operating manual. Marketplace database 108 also stores product or content search histories. Marketplace database 108 may also store contact information for users and for content manufacturers, suppliers, and owners. Marketplace users may create an account with the marketplace and marketplace database 108 stores user account and/or profile information. Marketplace database 108 may also store contact information for marketplace administrators. For example, contact information may include, but is not limited to, a phone number, an email address, a business address, etc.

The present invention may contain various accessible data sources, such as marketplace database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Notification program 106 enables the authorized and secure processing of personal data. Notification program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Notification program 106 provides information regarding personal data and the nature (e.g., type, scope, purpose, duration, etc.) of the processing. Notification program 106 provides the user with copies of stored personal data. Notification program 106 allows the correction or completion of incorrect or incomplete personal data. Notification program 106 allows the immediate deletion of personal data.

Client computing device 110 can be one or more of a laptop computer, a tablet computer, a smart phone, a smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 110 may be integrated into a vehicle of the user. For example, client computing device 110 may include a heads-up display in the windshield of the vehicle. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112.

User interface 112 provides an interface between notification program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 110 to input a search query for content stored in marketplace database 108 and receive search results. User interface 112 also enables a user of client computing device 110 to receive notifications from notification program 106. User interface 112 may also enable a user to create an account with the marketplace and input account and/or profile information.

Figure 2:
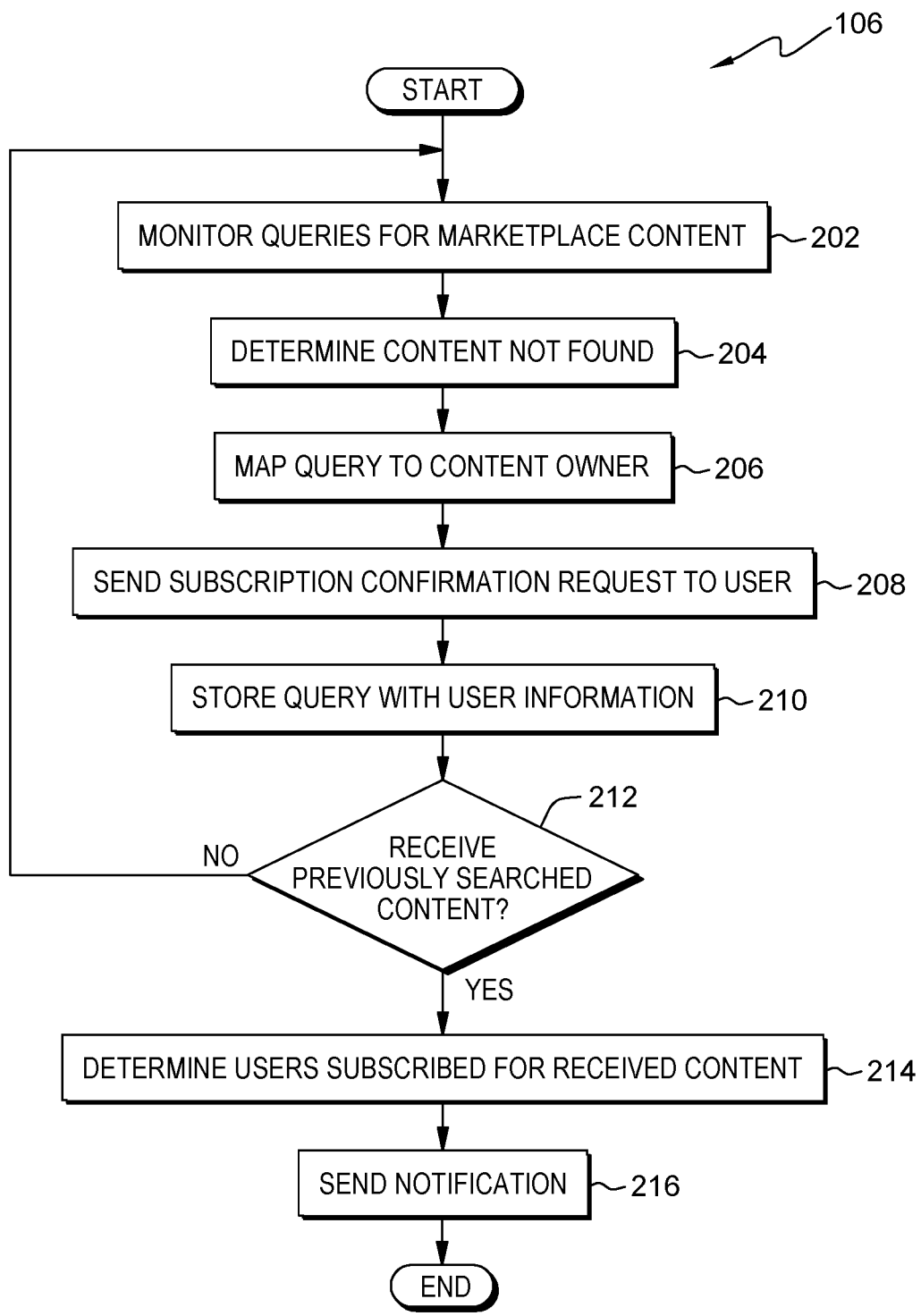
FIG. 2 is a flowchart depicting operational steps of a notification program, on a server computer within the distributed data processing environment of FIG. 1, for providing a notification of content to a marketplace subscriber, in accordance with an embodiment of the present invention.

FIG. 2 is a flowchart depicting operational steps of notification program 106, on server computer 104 within distributed data processing environment 100 of FIG. 1, for providing a notification of content to a marketplace subscriber, in accordance with an embodiment of the present invention.

Notification program 106 monitors queries for marketplace content (step 202). In an embodiment, notification program 106 continuously monitors and tracks queries, via user interface 112, input by users of marketplace content stored in marketplace database 108. For example, notification program 106 may monitor searches for particular part numbers or model numbers belonging to a manufacturer. While monitoring queries, notification program 106 creates a search history associated with the queries and stores the search history in marketplace database 108. Notification program 106 may organize the search history, for example, by user, i.e., the searcher, and/or by search terms, such as brand name.

Notification program 106 determines content is not found (step 204). In an embodiment, notification program 106 determines that content is not found when the query does not return a result, i.e., the result count is zero. In another embodiment, notification program 106 determines that content is not found by determining that no results were selected after the results were displayed via user interface 112. In a further embodiment, notification program 106 determines that content is not found by determining that a new query is input after the results are displayed via user interface 112.

Notification program 106 maps the query to the content owner (step 206). In an embodiment, notification program 106 maps the query to the owner of the content, whether that is a manufacturer, a supplier, or a third-party provider, thereby matching the content owner to the content. For example, notification program 106 may map the query based on specific keywords, such as model numbers. In another example, notification program 106 may map the query based on a brand name or company name. In one embodiment, the supplier may define the mapping. In another embodiment, a marketplace administrator may define the mapping, such as when the content owner is not a participant in the marketplace. In a further embodiment, users within an organization that search for digital resources may define the mapping. In yet another embodiment, the mapping may be defined using a combination of the supplier, the marketplace administrator, and the users.

Notification program 106 sends a subscription confirmation request to the user (step 208). In an embodiment, if notification program 106 determines that the no content was found for the user's search term, then notification program 106 prompts the user to subscribe to the marketplace such that notification program 106 can notify the user in the future if content is added to the marketplace that is associated with the previously searched for content. In the embodiment, notification program 106 transmits a message to the user via user interface 112. Notification program 106 may transmit the message via one or more known techniques, such as email or text message. For example, notification program 106 may transmit an email to the user stating that the content the user searched for is not currently available and asking the user to subscribe to the marketplace for notification of the content if the content becomes available. The technique that notification program 106 uses to notify the user may depend on what contact information for the user is stored in marketplace database 108. In another example, notification program 106 may display the message in place of a notification that the content was not found, such as an error message that states, "the result count is zero," with a toast message. In an embodiment, upon receiving an affirmative response to the subscription request, notification program 106 transmits an additional message, confirming the user is subscribed to the content, and adds the user to the subscription list.

Notification program 106 stores the query with user information (step 210). In an embodiment, notification program 106 stores the query in marketplace database 108 in association with the contact information and/or profile of the user who made the query. In an embodiment, notification program 106 may store the query in full. In another embodiment, notification program 106 may store one or more keywords associated with the query. For example, if the query was "company ABC model xy123," then notification program 106 may store the company name and the model number of the asset the user searched for.

Notification program 106 determines whether previously searched content has been received (decision block 212). In an embodiment, notification program 106 continuously monitors content and resources uploaded to marketplace database 108 to determine whether the new content was previously searched for by a user. Notification program 106 matches the newly received content title, associated attributes, and/or the content owner to queries made in the past. For example, notification program 106 monitors changes to marketplace database 108 on a periodic basis, such as every 12 hours. Notification program 106 compares any detected changes to the content in marketplace database 108 to the one or more stored queries that had previously resulted in no content found and determines if the previously searched content is now available.

If notification program 106 determines previously searched content has not been received ("no" branch, decision block 212), then notification program 106 returns to step 202 to continue monitoring search queries for content.

If notification program 106 determines previously searched content has been received ("yes" branch, decision block 212), then notification program 106 determines users subscribed for the received content (step 214). In an embodiment, responsive to determining that a content owner uploaded new content to marketplace database 108 that matches a previous query, notification program 106 determines any users that have subscribed to be notified of content matching a previous query. Notification program 106 searches marketplace database 108 for instances of queries of the newly received content associated with a subscribed user, such as content owner name, keywords, etc.

Notification program 106 sends a notification (step 216). In an embodiment, notification program 106 sends a notification to users subscribed to receive content associated with one or more queries that yielded no search results in the past. In the embodiment, notification program 106 transmits a message to the user via user interface 112. Notification program 106 may transmit the message via one or more known techniques, such as email or text message. For example, notification program 106 may transmit an email to the user that indicates the new content that is available for search. The technique that notification program 106 uses to notify the user may depend on what contact information for the user is stored in marketplace database 108. In another embodiment, notification program 106 may notify the user the next time the user logs in to the marketplace subsequent to the content owner uploading the new content, for example, with a toast message. In one embodiment, notification program 106 may also send a notification to other users that searched for the newly available content in the past but did not subscribe to the content in the marketplace.

Figure 3A:
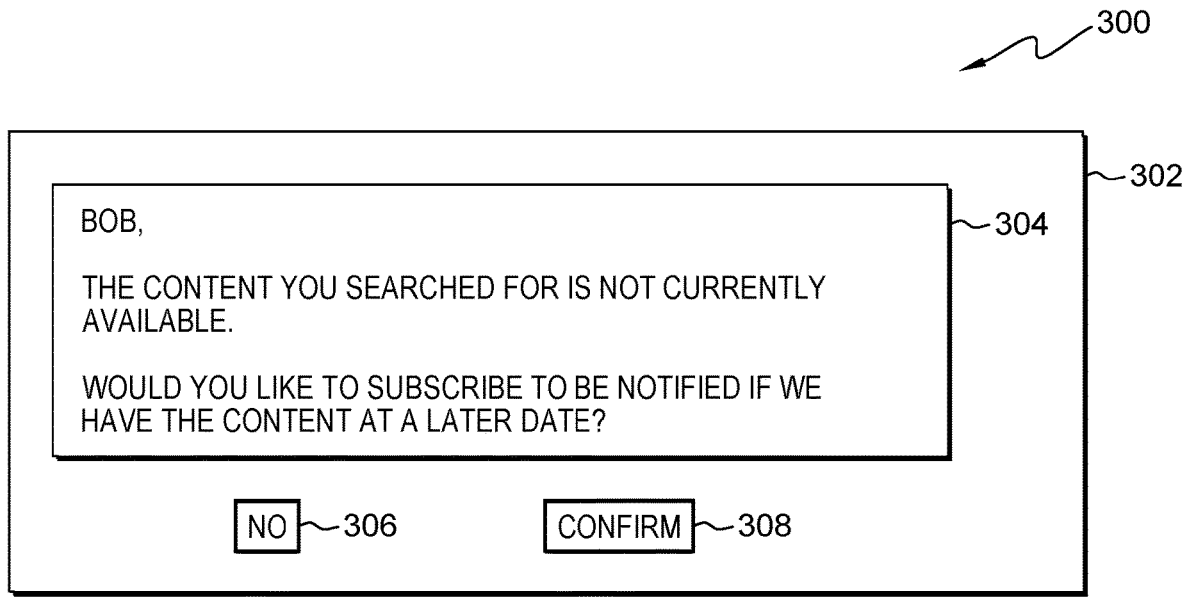
FIG. 3A illustrates an example of a subscription confirmation request provided by the notification program, on a client computing device within the distributed data processing environment of FIG. 1, in accordance with an embodiment of the present invention.

FIG. 3A illustrates example 300 of a subscription confirmation request provided by notification program 106, on client computing device 110 within distributed data processing environment 100 of FIG. 1, in accordance with an embodiment of the present invention.

FIG. 3A includes notification 302, which is an example of a notification that notification program 106 may provide to a user, via user interface 112, in response to the user unsuccessfully searching for content in Marketplace XYZ, as discussed with respect to step 208 of FIG. 2. Notification 302 includes message 304 which informs the user, Bob, that the content Bob searched for is not available. Notification 302 also includes button 306 and button 308. If Bob decides to subscribe to the marketplace in anticipation of the content being added at a later date, then Bob selects button 308, "confirm," to confirm the subscription. If Bob chooses not to subscribe, then Bob selects button 306.

Figure 3B:
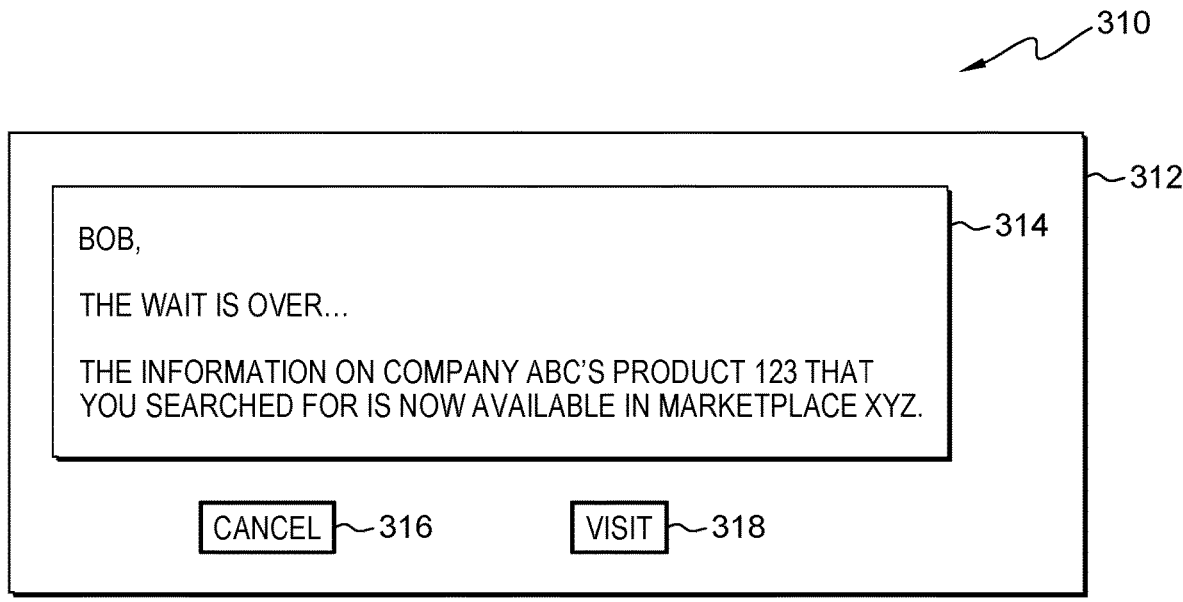
FIG. 3B illustrates an example of a content notification provided by the notification program, on the client computing device within the distributed data processing environment of FIG. 1, in accordance with an embodiment of the present invention.

FIG. 3B illustrates example 310 of a content notification provided by notification program 106, on client computing device 110 within distributed data processing environment 100 of FIG. 1, in accordance with an embodiment of the present invention.

FIG. 3B includes notification 312, which is an example of a notification that notification program 106 may provide to a user, via user interface 112, when content a user searched for in the past becomes available, as discussed with respect to step 216 of FIG. 2. Notification 312 includes message 314 which informs the user, Bob, that content he previously searched for in Marketplace XYZ is now available. Notification 312 also includes button 316 and button 318. If Bob decides to go back to Marketplace XYZ for the content he previously searched for, then Bob selects button 318 which is a link the marketplace. If Bob is not interested in the content, then Bob selects button 316.

Figure 4:
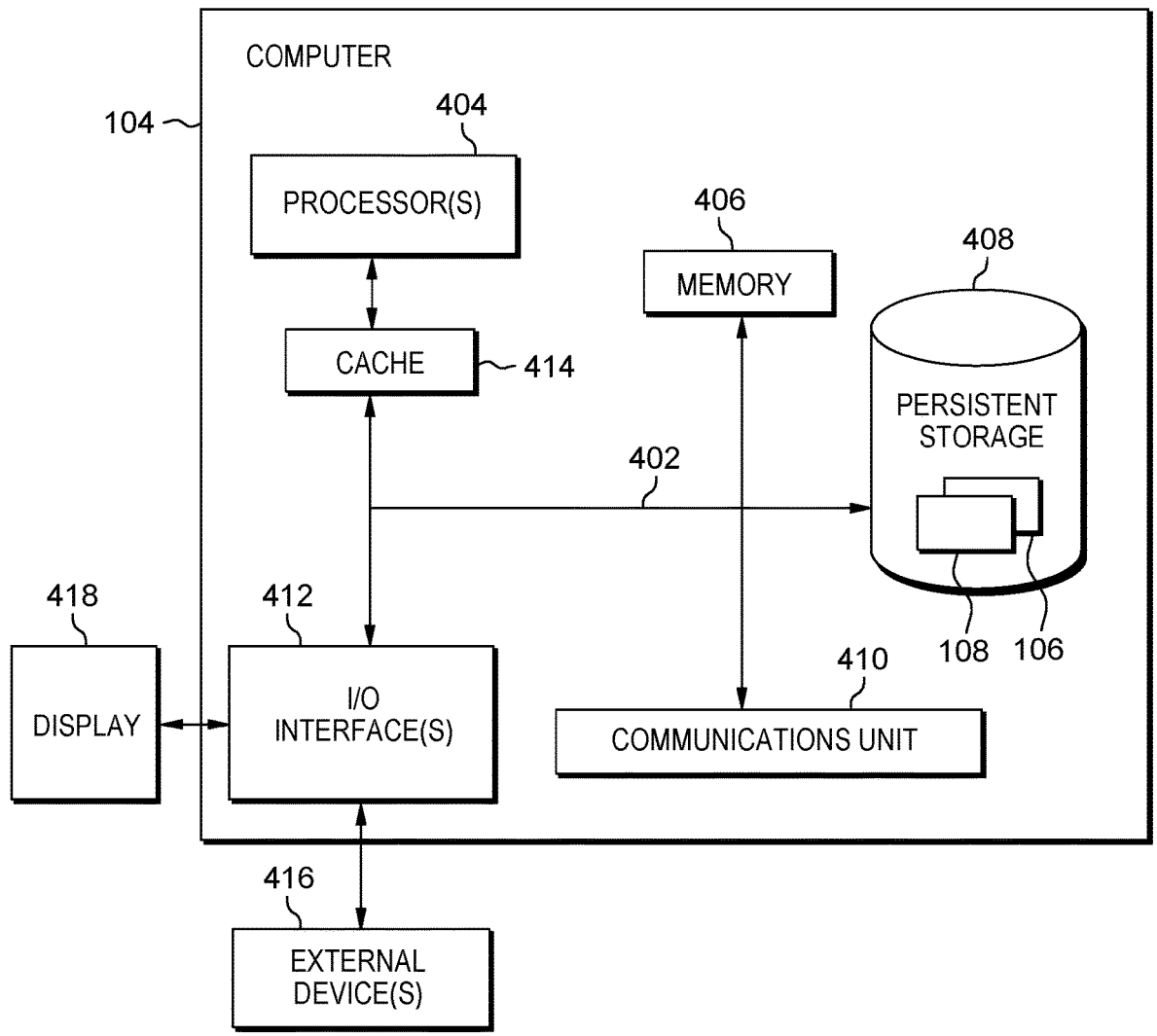
FIG. 4 depicts a block diagram of components of the server computer executing the notification program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., notification program 106 and marketplace database 108, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 110. In these examples, communications unit 410 includes one or more network interface cards. Communications unit 410 may provide communications through the use of either or both physical and wireless communications links. Notification program 106, marketplace database 108, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., notification program 106 and marketplace database 108 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
monitoring, by one or more computer processors, a query associated with one or more users for a first digital resource associated with a digital twin of a physical asset in a digital twin marketplace, wherein the digital twin represents an evolving virtual data model that mimics the physical asset and state changes of the physical asset, and wherein the digital twin marketplace enables sharing of digital resources associated with the physical asset;
displaying, by one or more computer processors, results of the query via a graphical user interface of a computing device associated with the one or more users;
determining, by one or more computer processors, that the results of the query were not selected;
based on the results of the query not being selected, determining, by one or more computer processors, that the first digital resource was not found;
continuously monitoring, by one or more computer processors, for digital resources uploaded to the digital twin marketplace;
receiving, by one or more computer processors, new digital resources uploaded to the digital twin marketplace, wherein the received new digital resources include an ownership history;
determining, by one or more computer processors, that at least one of the new digital resources uploaded to the digital twin marketplace corresponds to the query for which the first digital resource was not found;
determining, by one or more computer processors, that the one or more users logged in to the digital twin marketplace subsequent to the new digital resources being received;
responsive to determining that the one or more users logged in to the digital twin marketplace subsequent to the new digital resources being received, sending, by one or more computer processor, a notification via the graphical user interface to the one or more users of the at least one of the new digital resources uploaded to the digital twin marketplace that corresponds to the query for which the first digital resource was not found, wherein the graphical user interface includes a marketplace link button; and
receiving, by one or more computer processors, a response to the notification via a selection of the marketplace link button by the one or more users.

2. The computer-implemented method of claim 1, further comprising:
sending, by one or more computer processors, a subscription confirmation request to the one or more users associated with the query;
receiving, by one or more computer processors, at least one affirmative response to the subscription confirmation request from the one or more users; and
storing, by one or more computer processors, the query in association with the one or more users associated with the query from which the at least one affirmative response is received.

3. The computer-implemented method of claim 2, further comprising:
determining, by one or more computer processors, one or more users subscribed to the new digital resources; and
sending, by one or more computer processors, the notification to the one or more users subscribed to the new digital resources.

4. The computer-implemented method of claim 2, wherein sending the subscription confirmation request to one or more users associated with the query further comprises, prompting, by one or more computer processors, the one or more users to subscribe to the digital twin marketplace to receive a notification of digital resources added to the digital twin marketplace that is associated with the query for which digital resources was not found.

5. The computer-implemented method of claim 1, further comprising, matching, by one or more computer processors, the query to an owner of the digital resources based on a model number included in the query.

6. The computer-implemented method of claim 1, wherein determining that at least one of the new digital resources uploaded to the digital twin marketplace corresponds to the query for which the first digital resource was not found further comprises, matching, by one or more computer processors, a digital resource title, an associated attribute, and a content owner of the at least one of the new digital resources to the query for which the first digital resource was not found.

7. The computer-implemented method of claim 1, wherein the received new digital resources are associated with a physical asset, and wherein the received new digital resources include at least one of: a bill of materials, a warranty claim, a maintenance plan, a maintenance history, a part replacement history, a part usage history, a specification, an operating manual, usage data, an operating history, and an applicable standard.

8. A computer program product comprising:
one or more computer readable storage media and program instructions collectively stored on the one or more computer readable storage media, the stored program instructions comprising:
program instructions to monitor a query associated with one or more users for a first digital resource associated with a digital twin of a physical asset in a digital twin marketplace, wherein the digital twin represents an evolving virtual data model that mimics the physical asset and state changes of the physical asset, and wherein the digital twin marketplace enables sharing of digital resources associated with the physical asset;
program instructions to display results of the query via a graphical user interface of a computing device associated with the one or more users;
program instructions to determine that the results of the query were not selected;
based on the results of the query not being selected, program instructions to determine that the first digital resource was not found;
program instructions to continuously monitor for digital resources uploaded to the digital twin marketplace;
program instructions to receive new digital resources uploaded to the digital twin marketplace, wherein the received new digital resources include an ownership history;
program instructions to determine that at least one of the new digital resources uploaded to the digital twin marketplace corresponds to the query for which the first digital resource was not found;
program instructions to determine that the one or more users logged in to the digital twin marketplace subsequent to the new digital resources being received;
responsive to determining that the one or more users logged in to the digital twin marketplace subsequent to the new digital resources being received, program instructions to send a notification via the graphical user interface to the one or more users of the at least one of the new digital resources uploaded to the digital twin marketplace that corresponds to the query for which the first digital resource was not found, wherein the graphical user interface includes a marketplace link button; and program instructions to receive a response to the notification via a selection of the marketplace link button by the one or more users.

9. The computer program product of claim 8, the stored program instructions further comprising:
  program instructions to send a subscription confirmation request to the one or more users associated with the query;
  program instructions to receive at least one affirmative response to the subscription confirmation request from the one or more users; and
  program instructions to store the query in association with the one or more users associated with the query from which the at least one affirmative response is received.

10. The computer program product of claim 9, the stored program instructions further comprising:
  program instructions to determine one or more users subscribed to the new digital resources; and
  program instructions to send the notification to the one or more users subscribed to the new digital resources.

11. The computer program product of claim 9, wherein the stored program instructions to send the subscription confirmation request to one or more users associated with the query comprise, program instructions to prompt the one or more users to subscribe to the digital twin marketplace to receive a notification of digital resources added to the digital twin marketplace that is associated with the query for which the first digital resource was not found.

12. The computer program product of claim 8, the stored program instructions further comprising, program instructions to match the query to an owner of the digital resources based on a model number included in the query.

13. The computer program product of claim 8, wherein the stored program instructions to determine that at least one of the new digital resources uploaded to the digital twin marketplace corresponds to the query for which the first digital resource was not found further comprises, matching, by one or more computer processors, a digital resource title, an associated attribute, and a content owner of the at least one of the new digital resources to the query for which the first digital resource was not found.

14. The computer program product of claim 8, wherein the received new digital resources are associated with a physical asset, and wherein the received new digital resources include at least one of: a bill of materials, a warranty claim, a maintenance plan, a maintenance history, a part replacement history, a part usage history, a specification, an operating manual, usage data, an operating history, and an applicable standard.

15. A computer system comprising:
  one or more computer processors;
  one or more computer readable storage media;
  program instructions collectively stored on the one or more computer readable storage media for execution by at least one of the one or more computer processors, the stored program instructions comprising:
  program instructions to monitor a query associated with one or more users for a first digital resource associated with a digital twin of a physical asset in a digital twin marketplace, wherein the digital twin represents an evolving virtual data model that mimics the physical asset and state changes of the physical asset, and wherein the digital twin marketplace enables sharing of digital resources associated with the physical asset;
  program instructions to display results of the query via a graphical user interface of a computing device associated with the one or more users;
  program instructions to determine that the results of the query were not selected;
  based on the results of the query not being selected, program instructions to determine that the first digital resource was not found;
  program instructions to continuously monitor for digital resources uploaded to the digital twin marketplace;
  program instructions to receive new digital resources uploaded to the digital twin marketplace, wherein the received new digital resources include an ownership history;
  program instructions to determine that at least one of the new digital resources uploaded to the digital twin marketplace corresponds to the query for which the first digital resource was not found;
  program instructions to determine that the one or more users logged in to the digital twin marketplace subsequent to the new digital resources being received;
  responsive to determining that the one or more users logged in to the digital twin marketplace subsequent to the new digital resources being received, program instructions to send a notification via the graphical user interface to the one or more users of the at least one of the new digital resources uploaded to the digital twin marketplace that corresponds to the query for which the first digital resource was not found, wherein the graphical user interface includes a marketplace link button; and
  program instructions to receive a response to the notification via a selection of the marketplace link button by the one or more users.

16. The computer system of claim 15, the stored program instructions further comprising:
  program instructions to send a subscription confirmation request to the one or more users associated with the query;
  program instructions to receive at least one affirmative response to the subscription confirmation request from the one or more users; and
  program instructions to store the query in association with the one or more users associated with the query from which the at least one affirmative response is received.

17. The computer system of claim 16, the stored program instructions further comprising:
  program instructions to determine one or more users subscribed to the new digital resources; and
  program instructions to send the notification to the one or more users subscribed to the new digital resources.

18. The computer system of claim 16, wherein the stored program instructions to send the subscription confirmation request to one or more users associated with the query comprise, program instructions to prompt the one or more users to subscribe to the digital twin marketplace to receive a notification of digital resources added to the digital twin marketplace that is associated with the query for which the first digital resource was not found.

19. The computer system of claim 15, the stored program instructions further comprising, program instructions to match the query to an owner of the digital resources based on a model number included in the query.

20. The computer system of claim 15, wherein the stored program instructions to determine that at least one of the new digital resources uploaded to the digital twin marketplace corresponds to the query for which the first digital resource was not found further comprises, matching, by one or more computer processors, a digital resource title, an associated attribute, and a content owner of the at least one of the new digital resources to the query for which the first digital resource was not found.

\* \* \* \* \*